United States Patent [19]
Reyes

[11] Patent Number: 5,648,625
[45] Date of Patent: Jul. 15, 1997

[54] MUSICAL CHORD TRANSPOSER

[76] Inventor: James O. Reyes, 2791 W. St. Topaz, Tucson, Ariz. 85713

[21] Appl. No.: 440,690

[22] Filed: May 10, 1995

[51] Int. Cl.[6] ............................. G09B 15/02; G06C 29/00
[52] U.S. Cl. ......................... 84/475; 235/59 A; 84/477 R
[58] Field of Search ................................. 84/470 R, 475, 84/477 R, 600, 601, 602; 235/58 R, 59 R, 59 K

[56] References Cited

U.S. PATENT DOCUMENTS 4,064,782  12/1977  Laflamme ............................. 84/477 R
4,730,533  3/1988   Schoerkmagr ......................... 84/478

*Primary Examiner*—Michael L. Gellner
*Assistant Examiner*—Shihyung Hsieh

[57] ABSTRACT

An apparatus for the translation of musical chords from one key to another key. Both the electronics and mechanical embodiments of the invention permit the user to translate a musical score in a source key to a target key by identifying the appropriate chords for the target key. In the mechanical embodiments, the source key is physically aligned with the target key. This positions the chords to also be in aligned or associated with each other. In the electronics embodiment, the user establishes the source key and the target key to establish the chord mapping. In one electronic embodiment, the operator also identifies the source chord for the absolute identification of the targeted chord. Optionally, a listing of the chord mapping is printed for later reference or for transcription onto the musical score.

15 Claims, 4 Drawing Sheets

MUSICAL CHORD TRANSPOSER

BACKGROUND OF THE INVENTION

This invention relates generally to musical scores and more particularly to mechanisms used to map a specific musical chord to an appropriate chord in another key.

In 1883, Outre-Mer commented that "Music is the universal language of mankind". Although this is readily accepted, the creation of the language in a harmonic and pleasing manner has often eluded Man. One of the major problems with the creation of pleasing music lies in the musical score itself. When "Gradual", the first documented printed music, was first printed in 1472, the variety of instruments and songs was much more limited than they are today.

With this expanding variety of instruments and songs comes the need to play songs in different keys. Not all voices and instruments are able to play a song in a score's printed key. This forces the singers and the players to either "guess" at the proper translation to their key, or to attempt the song in the score's key. In either case, the result is far from optimal and pleasing.

This is particularly true with chords which are the sounding together of separate tones. These chords produce a harmony which is an extremely complex study within music and constitute what is referred to as the vertical or perpendicular dimension of music (melody being the horizontal aspect).

Although a seven-toned chord is possible, in practice, most music uses a three-toned chord commonly called a triad. Chords always relate to the key-scale of the music. That is, a C major key denotes the specific chords which are available.

The movement of a musical score from one key to another is not a simple task. Rather, it requires a great deal of work in moving the chords from their source key (in which the score is written) to the targeted key. To do this translation, the musician is forced into a time consuming and laborious task of manually mapping each chord into the new key.

Because of the complexity called for in this task, and the time so required, many musicians simply "guess" or do an "approximation" and hope that the resulting sound is acceptable.

It is clear from the foregoing that there is a significant need to create an apparatus to assist musicians in the translation of music from one key to another while making the process simple to complete accurately.

SUMMARY OF THE INVENTION

In the present invention, an apparatus for the translation of musical chords from one key to another key is created in both an electronics and a mechanical application. These embodiments of the invention permit the user to translate a musical score in a source key to a target key by identifying the appropriate chords in the target key.

In the mechanical embodiments, a source key indicia is aligned with the target key indicia. This positions the chords of the two keys to also be aligned or associated with each other.

In the electronics embodiment, the user establishes the source key and the target key to establish the chord mapping. In one electronic embodiment, the operator also identifies the source chord for the absolute identification of the targeted chord. Optionally, a listing of the chord mapping to the new key is printed for later reference or for transcription onto the musical score.

As noted, there are two contemplated classes of the invention: mechanical, and electronic. In either case, the invention is intended to be handheld and readily portable. Power, for either electronic operation, sound, or lights, is supplied by way of batteries.

The mechanical embodiments create aids in assisting the musician in identifying the targeted chords. To do this, the operator identifies the source key and the source chord which are to be mapped or translated. The mechanical aid then identifies the targeted chord by referencing the musician/user to the appropriate chord based on the targeted key.

The electronic embodiments operate in a similar manner allowing the musician/user to identify the source key and chord in determining the targeted chord. In the electronics embodiments though, the apparatus does the referencing procedures and identifies via displays (such as liquid crystal displays, light emitting diode displays, and other obvious to those of ordinary skill in the art) the chord which is appropriate for the targeted key.

In one form of the electronics embodiment, a printer is included to establish a paper record of the translation so that the mapping can be transposed easily onto the score once all of the targeted chords, in sequence, have been established. In this fashion, the musician simply moves through each source chord in sequence, prints the map out, and then later writes the mapped chord onto the musical score.

The invention, together with various embodiments thereof, will be more fully explained by the accompanying drawings and the following descriptions.

DRAWINGS IN BRIEF

DRAWINGS IN DETAIL

Figure 1:
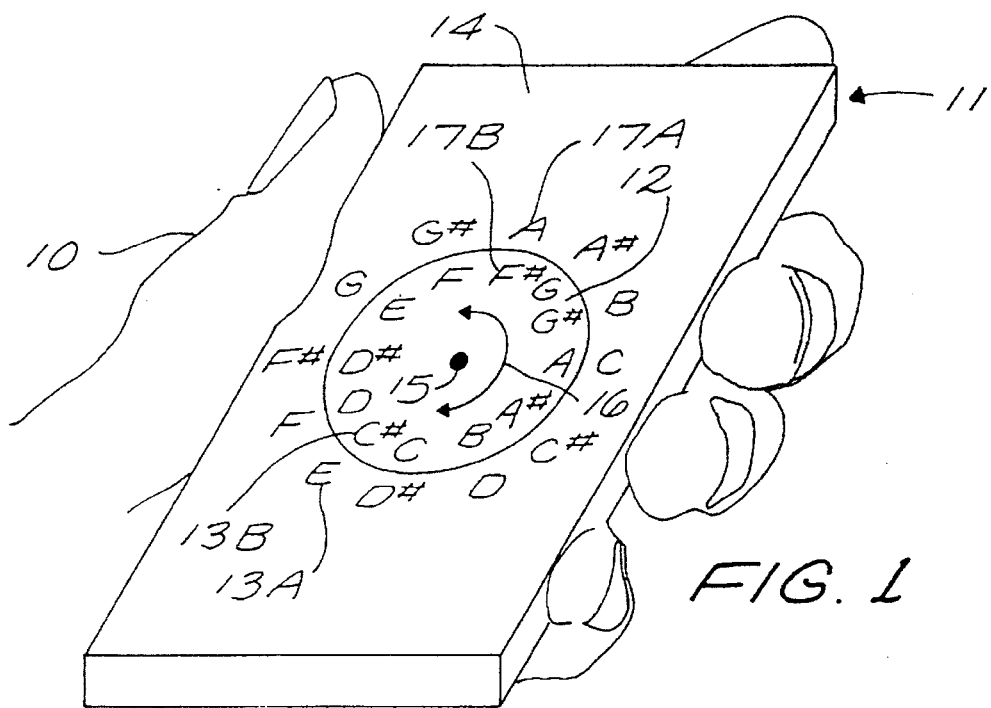
FIG. 1 is a perspective view of a mechanical embodiment of the invention.

FIG. 1 is a perspective view of a mechanical embodiment of the invention.

Mechanical apparatus 11 has two major components: planar member 14, and moveable member 12. Moveable member 12 is attached to planar member 14 via rivet 15 around which moveable member 12 rotates, as indicated by arrow 16.

Around the periphery of moveable member 12 are inscribed indicia representative of different keys. In a similar fashion, planar member 14 has indicia of the keys inscribed proximate to moveable member 12.

In operation, the user/musician rotates moveable member 12 until the targeted key (located on the periphery of moveable member 12), such as 13B, "C♯", aligns with the source key indicia (on planar member 14), 13B, "E". To identify the translation or mapping of a specific chord, the musician/user 10 finds the source chord on planar member 14 and the aligned chord on the moveable member 12 is the proper targeted chord.

As example, an "A", 17A, chord maps to an "F♯", 17B. Once so set for the source key and the targeted key, the musician/user is able to quickly move through a musical score and make the proper changes to the new key.

Figures 2A, 2B:
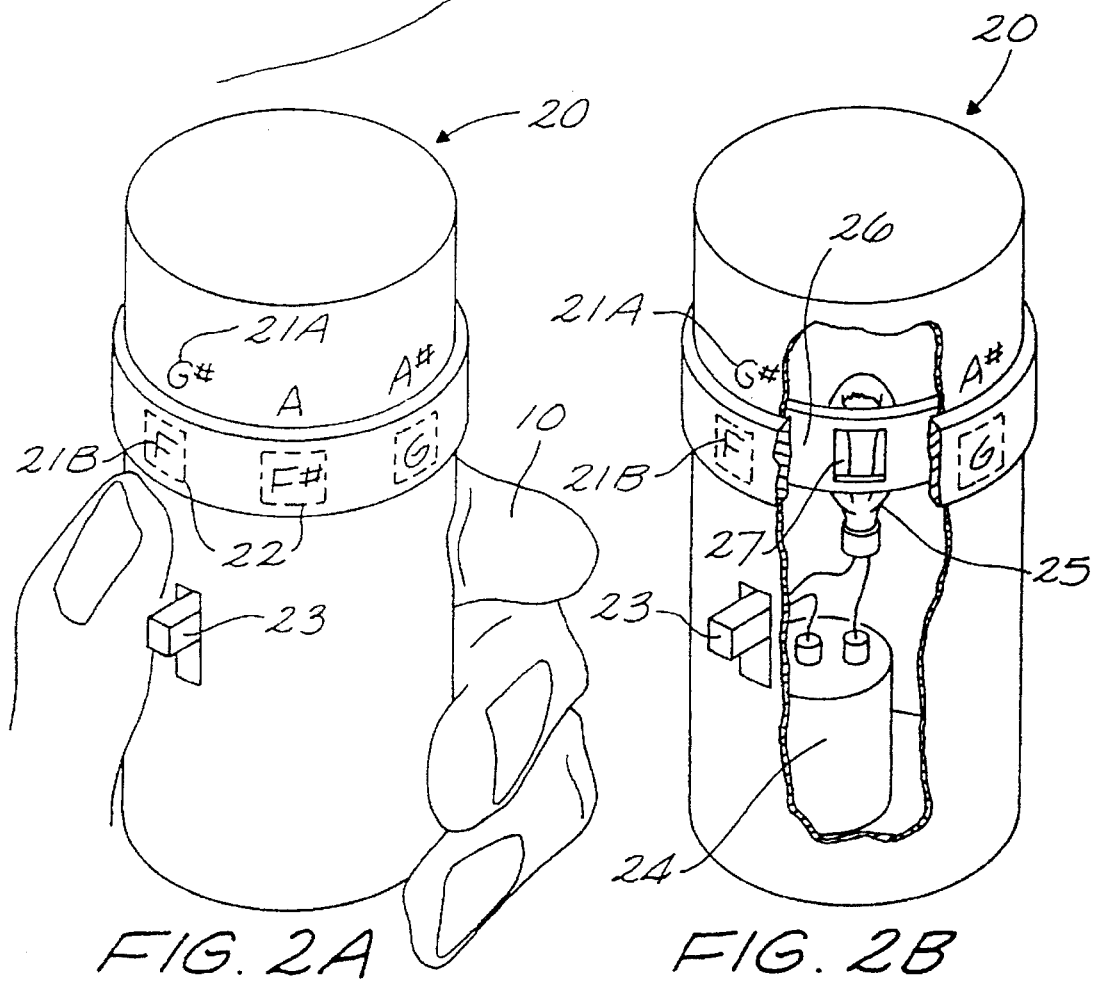
FIGS. 2A and 2B are frontal views of a mechanical embodiment of the invention showing an exterior view and a cut-away interior view.

FIGS. 2A and 2B are frontal views of a mechanical embodiment of the invention showing an exterior view and a cut-away interior view.

Handheld member 20, in this embodiment, is a member having a generally circular cross section. Band 21A contains all of the source keys while moveable member 21B contains all of the target keys.

Operation of this embodiment is similar to the mechanical embodiment of FIG. 1. The user/musician moves ring 21B so that the targeted key aligns with the source key 21A. To determine the targeted chord, the source chord is located (by rotating the entire apparatus 20 in the user's hand) until the source chord is located in zone 21A. The aligned indicia on ring 21B indicates the targeted chord.

In this embodiment, windows, such as 22, are positioned so that light emits only from the window on top. The user is able to physically move the apparatus 20 so that the source chord (in zone 21A) is on top and the targeted chord will have a light shine through its window to highlight the targeted chord.

Switch 23 is used to activate light 25 which is powered by battery 24. Moveable window 27 is positioned on rotating member 26. Rotating member 26 is weighted and permitted to freely rotate around the inside of apparatus 20 so that window 27 is always positioned at the highest point of rotating member 26. Those of ordinary skill in the art readily recognize various techniques which will accomplish this objective.

By being at the upper-most position within rotating member 26, window 27 allows light rays from light 25 to shine through one of the windows 22 on ring 21B and thereby highlight the targeted chord.

Figure 3:
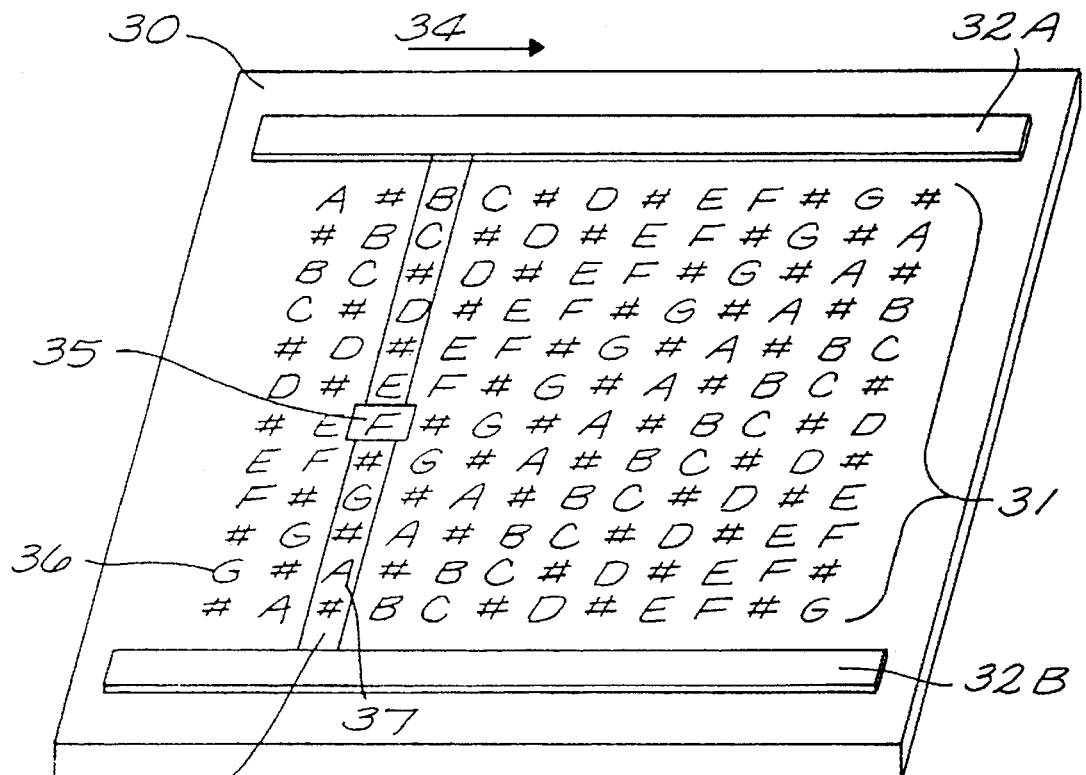
FIG. 3 is a perspective view of a third embodiment of the invention.

FIG. 3 is a perspective view of a third embodiment of the invention.

This mechanical embodiment uses a matrix denoting the keys and chords and their interrelationship.

Flat member 30 has a 12×12 matrix 31 established on it. In this embodiment, matrix 31 consists of the following notes/chords matrix:

```
A # B C # D # E F # G #
# B C # D # E F # G # A
B C # D # E F # G # A #
C # D # E F # G # A # B
# D # E F # G # A # B C
D # E F # G # A # B C #
# E F # G # A # B C # D
E F # G # A # B C # D #
F # G # A # B C # D # E
# G # A # B C # D # E F
G # A # B C # D # E F #
# A # B C # D # E F # G
```

Slide member 33 is supported by rails 32A and 32B so that slide member 33 is able to traverse the entirety of the matrix. On slide member 33 is target window 35.

In operation, the musician/user identifies the source key (in this case "D♯") along the left periphery of matrix 31. Slide member 33 is moved (as indicated by arrow 34) to the proper position so that window 35 identifies the source chord ("F" in this example). To map from the targeted key to a targeted chord, the musician/user scans along the left column of matrix 31 until the targeted key is found, then by moving along the row of that targeted key, the targeted chord is the one lying under slide 33.

As example, if the targeted key is "G", 36, then the targeted chord is "A", 37.

Figure 4:
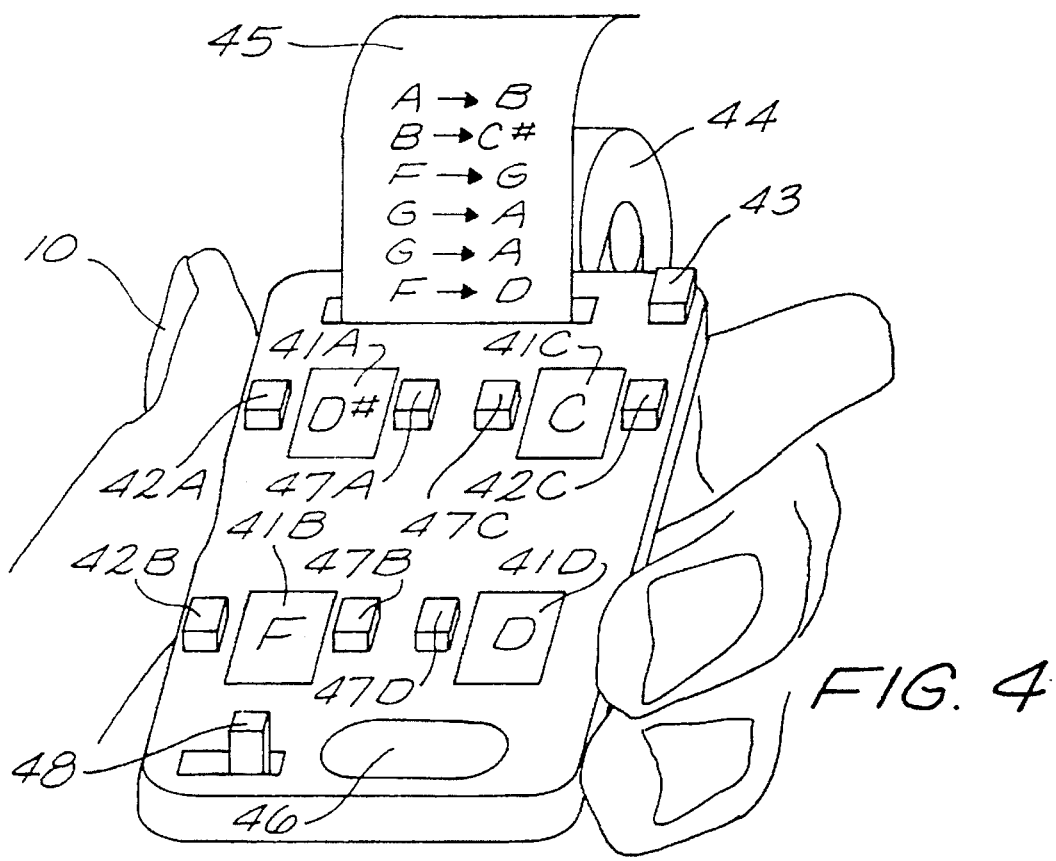
FIG. 4 is perspective view of an electronic embodiment of the invention.

FIG. 4 is a perspective view of an electronic embodiment of the invention.

This embodiment is hand-held by musician/user 10 as are the other embodiments; but, in this case a vast amount of the analysis is done by the electronics. Four displays 41A, 41B, 41C, and 41D are used to display the source key, the source chord, the targeted key, and the targeted chord respectively.

Selection of the source key, source chord, and the targeted chord is accomplished by musician/user 10 via the keyboard consisting of switches 42A, 42B, and 42C respectively. By scrolling through the twelve possibilities (A, A♯, B, C, C♯, D, D♯, E, F, F♯, G, G♯), musician/user 10 is able to set the three variables and thereby establish the targeted chord as shown in display 11D.

As shown, in this illustration, a source key of "D♯" (display 41A), and a source chord of "F" (display 41B), going to targeted key of "C" (display 41C) should be mapped to targeted chord "D" (display 41D).

Musician/user 10 is able to make a paper history by depressing print button 43 which causes a printer (not shown) to generate, from paper roll 44, a listing 45 which shows the mapping of chords. This paper copy is particularly useful for later editing of the musical score by musician/user 10.

Each note or chord is audibly synthesized through speaker 46 when the musician/user depresses audio switches 47A, 47B, 47C, or 47D. This gives the musician/user the ability to create the sound so that its affect can be evaluated. Those of ordinary skill in the art readily recognize various methods which can be employed for the creation of this sound synthesis.

Power switch 48 is used to activate and deactivate the entire device by either connecting or disconnecting the power source from the rest of the electronics.

Figure 5:
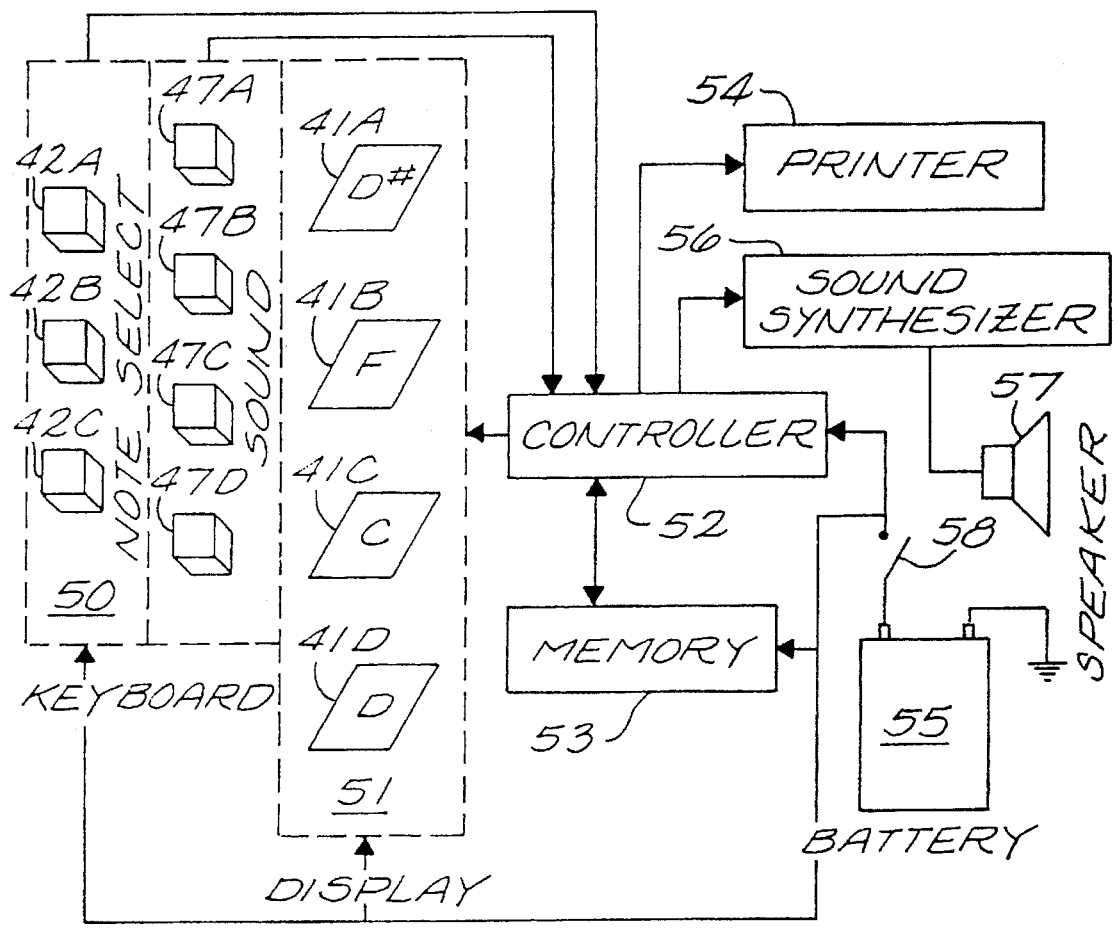
FIG. 5 is a block schematic of the operation of the electronic embodiment illustrated in FIG. 4.

FIG. 5 is a block schematic of the operation of the electronic embodiment illustrated in FIG. 4.

At the center of the operation is controller 52 which is either a controller microchip, a processor, or a computer. Controller 52 receives the musician/user's data via keyboard 50 and uses this data to withdraw information from memory 53. The musician/user data is displayed by controller 52 via display 51 (specifically displays 41A, 41B, and 41c, as discussed before). The information withdrawn from memory 53 is communicated via display 51 (display 41D).

The same information is also communicated via printer 54 under the direction of controller 52.

When the musician/user activates one of switches 47A, 47B, 47C, or 47D, controller 52 directs sound synthesizer 56 create the sound corresponding to that displayed in the associated display (41A, 41B, 41C, or 41D) via speaker 57. This gives the musician/user an auditory feed-back of the sound being created.

The entire assembly is powered by battery 55 which is connected/disconnect via switch 58.

Figure 6:
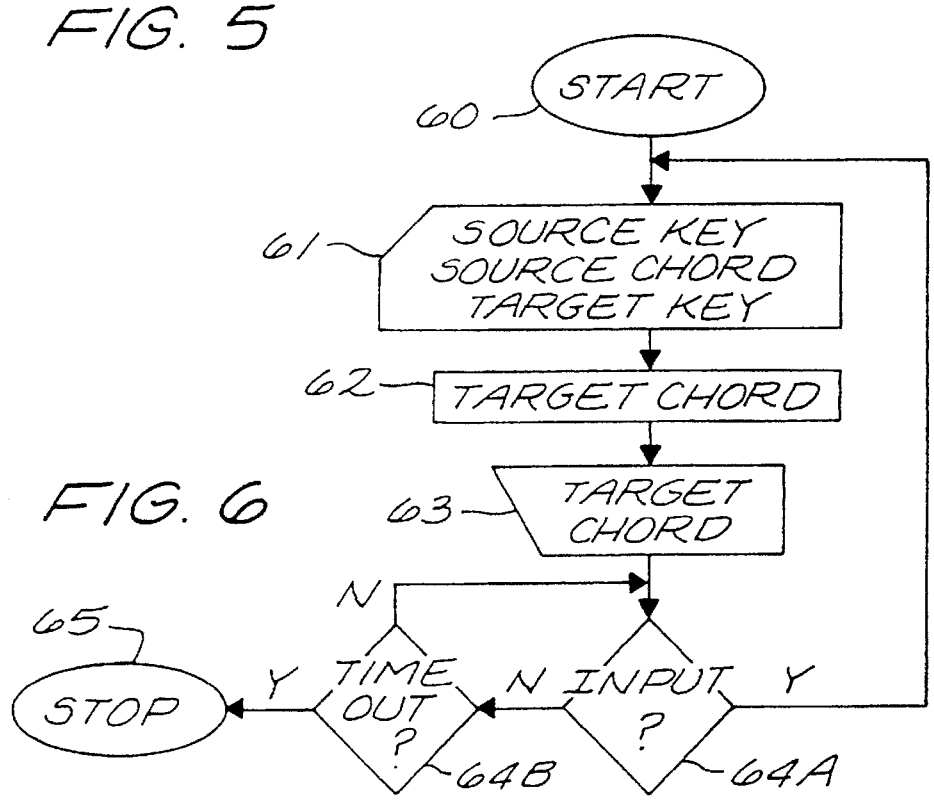
FIG. 6 is a flow-chart for the operation of an electronic embodiment similar to that shown in FIG. 4.

FIG. 6 is a flow-chart for the operation of an electronic embodiment similar to that shown in FIG. 4.

After "start" 60, data from the operator is collected 61. This data includes the source key, the source chord, and the target key. Using this data, the program identifies the target chord 62 and then displays this target chord 63.

If more input 64A has been received, the program cycles back to obtain more user data 61; otherwise, a determination of "time out" is made 64B. "Time out" is a lapse of time in "idle" mode after which the program terminates. This acts as an automatic "off" to the mechanism to preserve battery power.

If time-out 64B has not occurred, the program cycles back to check for input 64A; otherwise, the program "Stops" 65.

Figure 7:
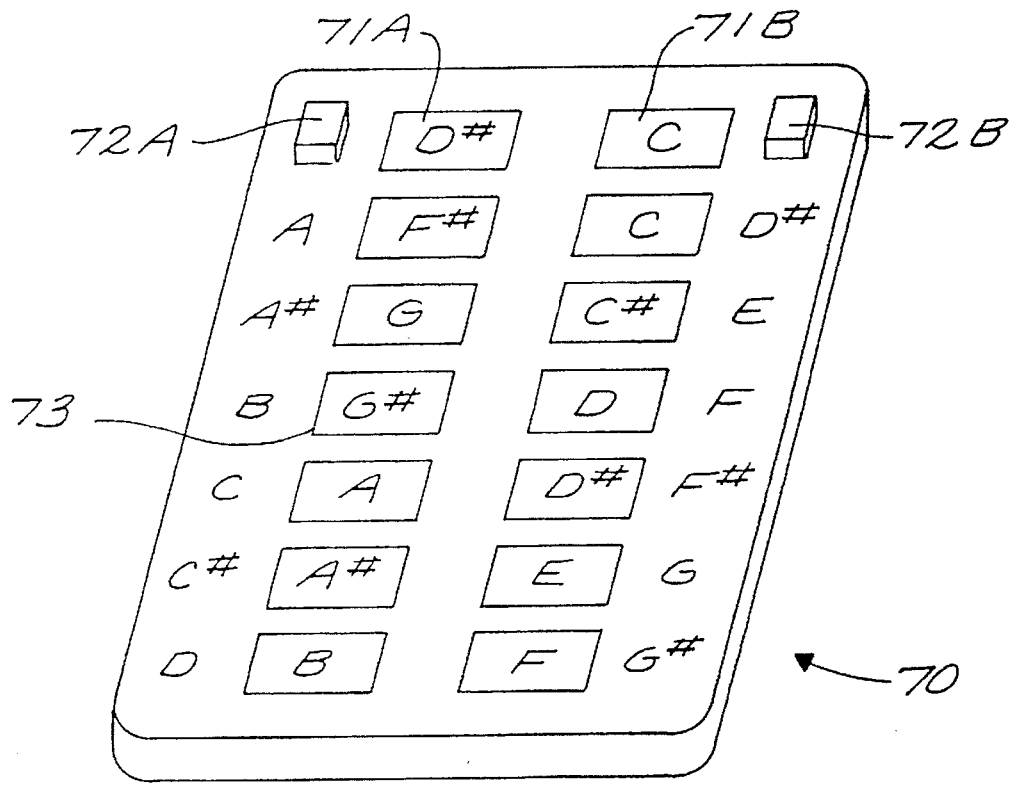
FIG. 7 is a perspective view of the preferred electronic embodiment of the invention.

FIG. 7 is a perspective view of the preferred electronic embodiment of the invention.

This embodiment 70 uses only two input elements: the source key and the target key. The source key is established by the musician/user via switch 72A and the data is displayed via window 71A. In like fashion, the target key is established via switch 72B and the established target key is displayed via display 71B.

Once these two data elements are entered, the device shows all of the different chord mapping which can occur. This is communicated through display windows such as window 73. Each of these windows has a printed indicia associated with it; these indicia represent the source chords.

In this example, the targeted chord with from a source key of "D♯" (71A) to a targeted key "C" (71B) with a source chord of "B", is a "G♯" chord (73).

This embodiment is particularly useful for simultaneously establishing all of the chords, once the source key and targeted key are established, so that the musician/user is able to quickly and easily go through an entire musical score making the proper changes without having to input data into the apparatus. As an enhancement to this embodiment, sound generation for each of the notes is built into the unit allowing the musician/user to press a key associated with a window/display and to get the note or chord displayed therein audibly generated.

Figure 8:
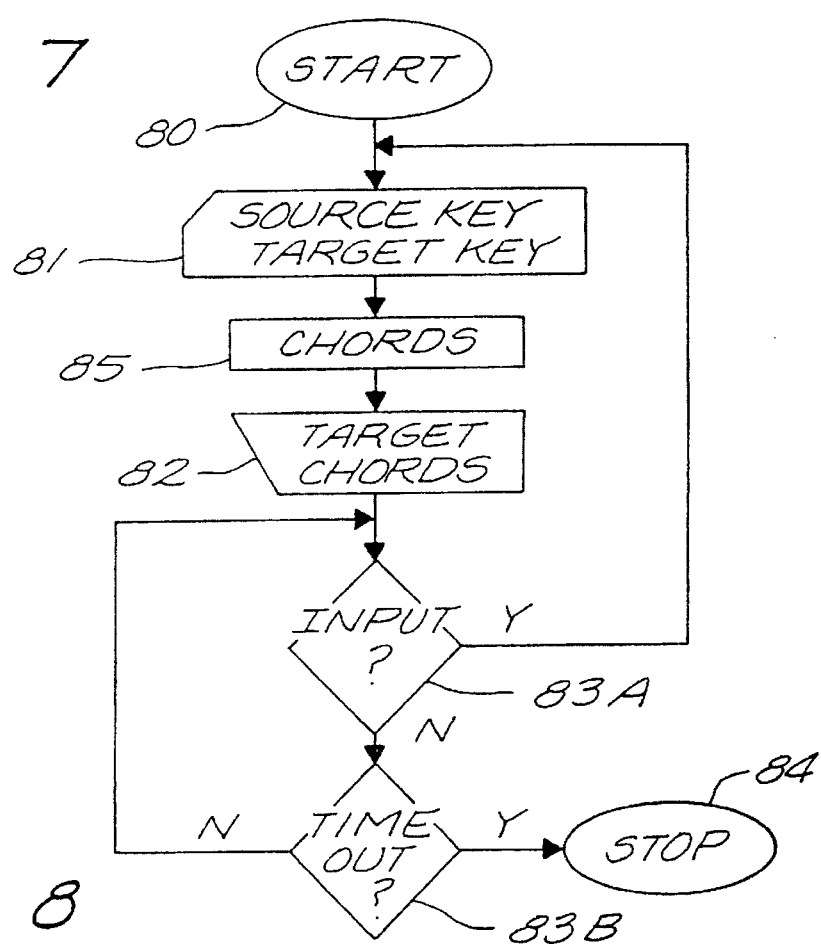
FIG. 8 is a flow-chart of the operation of the preferred electronic embodiment of the invention.

FIG. 8 is a flow-chart of the operation of the alternative electronic embodiment of the invention as shown in FIG. 7.

After "start" 80, the source key and target key data is collected 81 and all chords associated therewith are established 85. These target chords are displayed 82.

Again, the device is monitored for any input 83A and if there has been, the operation cycles back to accept data input 81; otherwise, the time-out check 83B is made and the program either terminates 84, or it cycles back to check for more input 83A.

It is clear from the foregoing that the present invention creates a highly improved mechanism (both electronic and mechanical) to map chords from one key to another.

What is claimed is:

1. An apparatus for automatically translating musical chords comprising:
   a) a display means for communicating information to an operator;
   b) a keyboard for operator entry of data having at least three switches; and,
   c) a control means for,
      1) accepting, via said keyboard, source key data,
      2) accepting, via said keyboard, source chord data,
      3) based upon said source key data and said source chord data, identifying a target chord,
      4) communicating said target chord, via said display means, to an operator, and,
      5) scrolling through a predefined list of source key data, source chord data, and target key data based upon activation of each of said at least three switches.

2. The apparatus according to claim 1 wherein said control means includes means for accepting, via said keyboard, target key data, and wherein said means for identifying of said control means uses said target key data in identifying the target chord.

3. The apparatus according to claim 2 wherein said display means includes a first display window, a second display window, a third display window, and a fourth display window, and wherein said keyboard includes at least three switches, each of said switches being positioned to be associated with one of said at least four display windows.

4. The apparatus according to claim 3 wherein said control means includes means for displaying via:
   a) the first display window, the source key data entered via an associated first switch;
   b) the second display window, the source chord data entered via an associated second switch;
   c) the third display window, the target key data entered via an associated third switch; and,
   d) the fourth display window, the target chord.

5. The apparatus according to claim 4 further including a printer mechanism for printing alpha-numeric characters onto paper, and wherein said control means includes means for printing, via said printer mechanism, said target chord.

6. The apparatus according to claim 5 further including a power source for providing energy to said display means, said keyboard, and said control means, and wherein said control means includes means for deactivating said display means after a lapse of a preselected period of time without operator entry of data via said keyboard.

7. The apparatus according to claim 2 further including sound generation means for generating an audible sound and wherein said control means includes means for directing said sound generation means to generate a sound corresponding to a selective note corresponding to said source key data, said source chord data, said target key data, or said target chord data.

8. A handheld apparatus used for translating chords to another key, said handheld apparatus comprising:
   a) handheld means for operator identification of a source key, a source chord key, and a target key; and,
   b) mounted on said handheld means, means for scrolling through a predefined list of source key data, source chord data, and target key data based upon activation of said source key, said source chord key and said target key and identifying a unique target chord.

9. The handheld apparatus according to claim 8 wherein said handheld means for operator identification includes:
   a) a display means for communicating information to an operator;
   b) a keyboard for operator entry of data via a source key, a source chord key, and a target key; and,
   c) a control means for,
      1) scrolling through a predefined list of source key data, source chord data, and target key data based upon activation of said source key, said source chord key and said target key; and,
      2) communicating said target chord, via said display means, to an operator.

10. The handheld apparatus according to claim 9 wherein said control means includes means for accepting, via said keyboard, target key data, and wherein said means for identifying of said control means uses said target key data in identifying the target chord.

11. The handheld apparatus according to claim 10 wherein said display means includes at least four display windows and wherein said keyboard includes at least three switches, each of said switches being positioned to be associated with one of said at least four display windows.

12. The handheld apparatus according to claim 11 wherein said control means includes means for displaying via:

a) a first display window, the source key data entered via an associated switch;

b) a second display window, the source chord data entered via an associated switch;

c) a third display window, the target key data entered via an associated switch; and, d) a fourth display window, the target chord.

13. The handheld apparatus according to claim 12 further including a printer mechanism for printing alpha-numeric characters onto paper, and wherein said control means includes means for printing, via said printer mechanism, said target chord.

14. The handheld apparatus according to claim 13 further including a power source for providing energy to said display means, said keyboard, and said control means, and wherein said control means includes means for deactivating said display means after a lapse of a preselected period of time without operator entry of data via said keyboard.

15. The handheld apparatus according to claim 9 wherein said display means includes fourteen windows and wherein said keyboard includes two switches, each of said switches being associated either a first or second window of said fourteen windows, and wherein said control means includes:

a) means for displaying the source key data via a window associated with a first switch and as per operator input via said first switch;

b) means for displaying the source chord data via a window associated with a second switch and as per operator input via said second switch; and, c) means for identifying and displaying, via twelve of said windows, twelve chord mapping for twelve preselected target keys.

\* \* \* \* \*